Nov. 8, 1949   O. F. MEYER ET AL   2,487,162
PROCESS FOR DEHYDRATING ALFALFA
Filed July 24, 1947   2 Sheets-Sheet 2

Inventors
Otto F. Meyer
Harlow L. Schmidt
Roland E. Owens
William W. Miner, Jr.

By Thos. E. Scofield
Attorney

Patented Nov. 8, 1949

2,487,162

UNITED STATES PATENT OFFICE 2,487,162

PROCESS FOR DEHYDRATING ALFALFA

Otto F. Meyer and Harlow L. Schmidt, Lexington, and Roland E. Owens and William W. Miner, Jr., Verdon, Nebr., assignors to U. S. Alfalfa Products Company, Verdon, Nebr., a corporation of Nebraska Application July 24, 1947, Serial No. 763,300

4 Claims. (Cl. 99—2)

This invention relates to improvements in a process and apparatus for dehydrating stock feed and refers more particularly to an improved method of dehydration wherein moisture is more completely and uniformly extracted and the dehydrated product which is produced is in relatively coarser state than the meals produced by conventional methods.

At present alfalfa, after cutting, is dried at relatively high temperature and then pulverized in a hammer mill or other pulverizer to reduce the dried material to a relatively fine powder or flour. This method is objectionable since considerable losses result from the dust produced and in powdered form the product is not in desirable condition for stock and poultry feed. The vitamin potency of the product is seriously affected, not only by the high temperatures used in drying, but due to losses in storage on account of the fine particle size which affords large surface areas for oxidation. The pulverized material is not suited for feed, particularly of ruminant animals, since it is in a relatively predigested condition and provides no roughage to the stock.

The instant process as applied to alfalfa is an improvement over dehydrating methods of the conventional type because the alfalfa prior to drying is reduced to a relatively uniform size and put in a condition for the complete and rapid extraction of moisture at considerably lower temperatures than are required when the chopped plant is processed by present methods.

An object, therefore, is to provide a method for the production of chopped alfalfa wherein the stems and leafy portions are reduced to substantially the same physical characteristics as to size and moisture content.

Another object is to provide process for dehydrating alfalfa or other forage crops by which there is effected a more uniform and more rapid extraction with less loss of vitamin potency.

Another object is to provide a process of dehydration by means of which a product is produced that can be stored for a longer period of time with less likelihood of heating, molding, discoloration and vitamin loss.

A further object is to provide a roughage more uniformly dehydrated and one which is susceptible of being baled in a much more compact condition, stored in less space, and readily pelletized.

Other and further objects will appear from the following description.

In the accompanying drawings which form a part of the instant specification and are to be read in conjunction therewith, like reference numerals indicate like parts in the various views.

Figs. 1 and 1a are elevational views showing an apparatus diagrammatically in which the process may be practiced.

Figure 1:
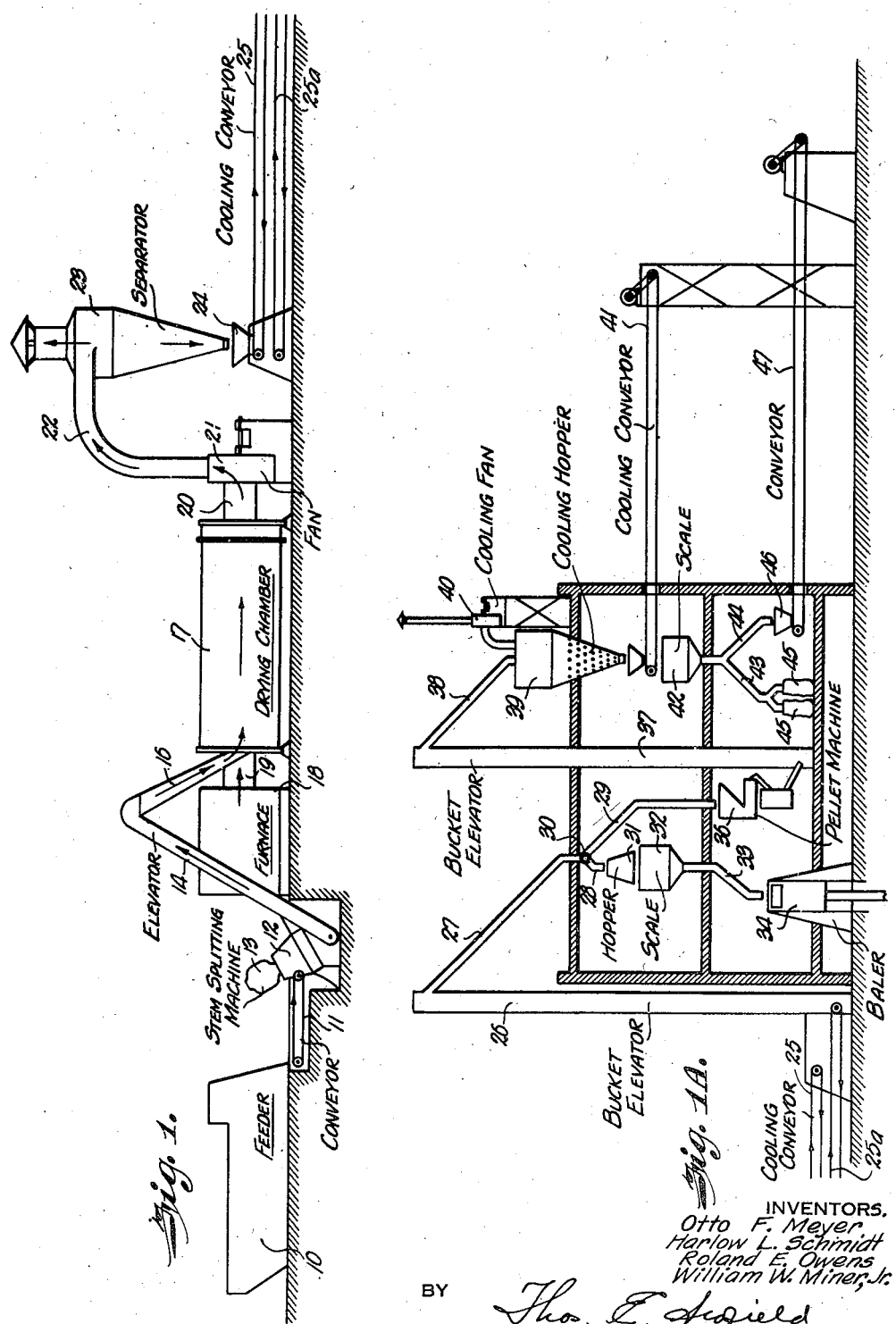

To facilitate an understanding of the description of the apparatus which follows, the process will first be briefly explained as used and applied to alfalfa.

Fresh cut alfalfa is charged to a stem splitting disintegrator or stem splitting machine where the stems and leafy portion are reduced to a relatively uniform size. In other words, the tough, solid moisture-containing stems are crushed or disintegrated longitudinally into a fiber thickness corresponding to the leafy portion of the plant. Upon discharge from the disintegrator, the fibrous pieces of the stem have been reduced to a density and gravitational weight substantially that of the leafy portion and these pieces have moisture availability and extractability corresponding substantially to the leafy portion. This is done in order that moisture may be uniformly removed from all parts of the plant in the dehydrating step which follows. From the crusher or disintegrator the material is passed to the drying chamber where it is heated to a temperature sufficient to evaporate off the major portion of the moisture. In the drying step the process is unique over conventional methods as heretofore drying has been effected without attempting to reduce the stems so moisture could be extracted uniformly from both the leaf and stem portions. As a consequence, the moisture was rather completely extracted from the leaves while the moisture in the stem remained relatively intact.

After drying, the material is passed through a separator where the moisture is removed from the solids. The dried solids are then run over conveyors which may be artificially cooled or subjected merely to atmospheric conditions and wherein the temperature of the dehydrated product is reduced substantially to that of the atmosphere. After cooling in this fashion the cooled material is directed to a baling or pelletizing apparatus from which it is discharged and sacked or baled, as the case may be, or put into bulk storage.

Referring to the drawings, at 10 is shown a feeding mechanism to which is charged the fresh cut alfalfa from trucks or wagons. At 11 is shown a conveyor such as a belt or chain operated raddle by which the alfalfa is passed from the feeder to crusher or disintegrator 12. The disintegrator is driven by motor 13 and is preferably that which is shown and described in an application for Letters Patent Serial No. 701,882, filed October 8, 1946, in the names of William Wiley Miner, Jr., Roland Owens, and Ned Ray. Upon discharge from the bottom of the disintegrator or stem splitting machine 12, the alfalfa hay whose stems have been crushed and cut into lengths of four inches or less are raised by an enclosed elevating mechanism 14 and discharged into chute 16 which feeds the material into drying chamber 17. The drier or dehydrator is preferably a cylindrical vessel rotated during the drying operation by a driving mechanism not shown. The drying chamber is heated by combustion gases supplied from furnace 18 through pipe 19. After drying, the alfalfa is passed through discharge pipe 20 to an exhaust fan 21 which discharges it with the water vapor through pipe 22 into separator 23. After separation, the solid material is withdrawn from the bottom and the water vapor from the top. The dehydrated alfalfa roughage accumulated in hopper 24 is distributed upon traveling cooling conveyors 25 and 25a, passing first along the length of the upper conveyor and then the length of the lower conveyor.

The material is discharged from the lower conveyor into a second elevating mechanism 26 by which it is raised into chute 27 and distributed either to a baler through pipe 28, or to a pellitizer through pipe 29. A two-way valve 30 at the junction of pipes 27, 28 and 29 provides selective manual control for the distribution of the material. If directed through pipe 28, the material is supplied to hopper 31, thence to a scale 32 from which it is discharged through pipe 33 to a baler, diagrammatically shown at 34. If directed through pipe 29 the chops are pressed into pellets of suitable size in the pellet machine diagrammatically shown at 36. After being pelletized, the product is raised by elevator 37 and passed through chute 38 to a cooling hopper 39. Air is drawn through the hopper by fan 40 to remove heat generated in the pellets during the pelletizing operation. This fan cooling operation may be supplemented by a cooling conveyor shown at 41. After passing through this second cooling step the pellets are discharged into scale 42, equipped with dual discharge pipes 43 and 44. If the pellets are to be sacked, they are discharged through pipe 43 into sacks 45. If they are to be stored in bulk or shipped in bulk, they are discharged through pipe 44 into hopper 46, thence on to conveyor 47 to suitable transporting means not shown.

As previously suggested, the disintegrator or stem splitting machine decorticates the moisture laden stem fibers, making possible more uniform drying of all parts of the stems and leaves. Since the leaves and stems are now of a more uniform size, advance through the drying chamber of all portions of the plant is at relatively the same speed. Moisture is brought to the surface of the fibrous material by the action of the disintegrator and gives effective protection to the product during dehydration. It also renders the moisture more easily extractable by the drier. Due to the foregoing the drier may be operated at lower outlet temperatures than have been utilized heretofore. It has been found, for example, that a drier conventionally operated at an outlet temperature of 275° to 350° F. will effectively and satisfactorily dispell the moisture from material prepared according to the invention when now operated at an outlet temperature of only 225° to 300° F. This means that the maximum temperature which the material itself reaches in the drier is 40° to 50° F. lower than heretofore; assuming a maximum material temperature of 250° to 275° F. by conventional methods this can be reduced to 200° to 225° F. by use of the stem splitter or disintegrator. It also has been found that 50° more material by weight may be run through the drier than in methods where the stem splitter or disintegrator is not used.

It will be noted that fans used for conveyors to a great extent have been entirely eliminated from the apparatus. The rapidly rotating blades of fans are objectionable as they disintegrate and pulverize the dried product. In the apparatus shown but a single fan 21 in the discharge line from the drier is the only apparatus employing rapidly rotating blades which contact the alfalfa from the time it is discharged from the disintegrator until it is baled or pelletized.

The cooling conveyors and elevators handle the material more gently and do not break up or appreciably reduce the particle size of the alfalfa roughage. Consequently there is little loss from dust and the material contains from 30% to 50% coarse grade product which is admirably suited for livestock feeding. The coarseness of the product makes it particularly adaptable to rapid handling in hoppers and automtaic scales without appreciable loss from dusting or the escape of fines. The baling of the coarse material is only after cooling so overheating is not a problem.

The low temperatures of drying, the immediate cooling after the drying operation, and the uniformity of moisture extraction produces a product which is much higher in vitamin content, particularly carotene, than materials produced in conventional methods. The product after baling or pelletizing can be stored without danger of excessive losses due to overheating or molding and with considerably less loss of vitamin content than are alfalfa products made by other drying methods. The retention of the green color is probably the most significant characteristic of the alfalfa and this color remains both after baling or pelletizing, indicating the maintenance of high nutrient value in the ultimate product.

The material, on delivery to the pelleting machine, is cooled to atmospheric temperature and in its relatively coarse state is pelletized into desired sizes. Pelletizing of the coarse material eliminates losses of valuable nutrients which inevitably accompanies disintegration to powder or fine particle size. Less power is necessary to successfully pelletize the coarse material than the flour-like product made in conventional hammer mills. The pelleting machine for agglomerating this alfalfa roughage requires but 50 H. P., while that employed with the finely ground product require from 100 to 150 H. P. Heat generated in the pelleting machine is removed in the cooling hopper and conveyor. Finely ground material produced by conventional methods which is sacked immediately is in a heated state which makes for more rapid deterioration because of the retention of heat for a relatively long period.

As far as the sacking is concerned, the coarse product can be sacked in containers of larger mesh and smaller size which are more easily handled than those required for the finer ground product. The coarse product is more easily handled in bulk, bales or pellets and lends itself more readily to bulk car loading. Finely ground meal on the other hand is impractical to handle in bulk. The bulk storage of pellets can be handled in elevator terminals and loaded, stored and transported in the same fashion as are many of the grain crops.

Figure 2:
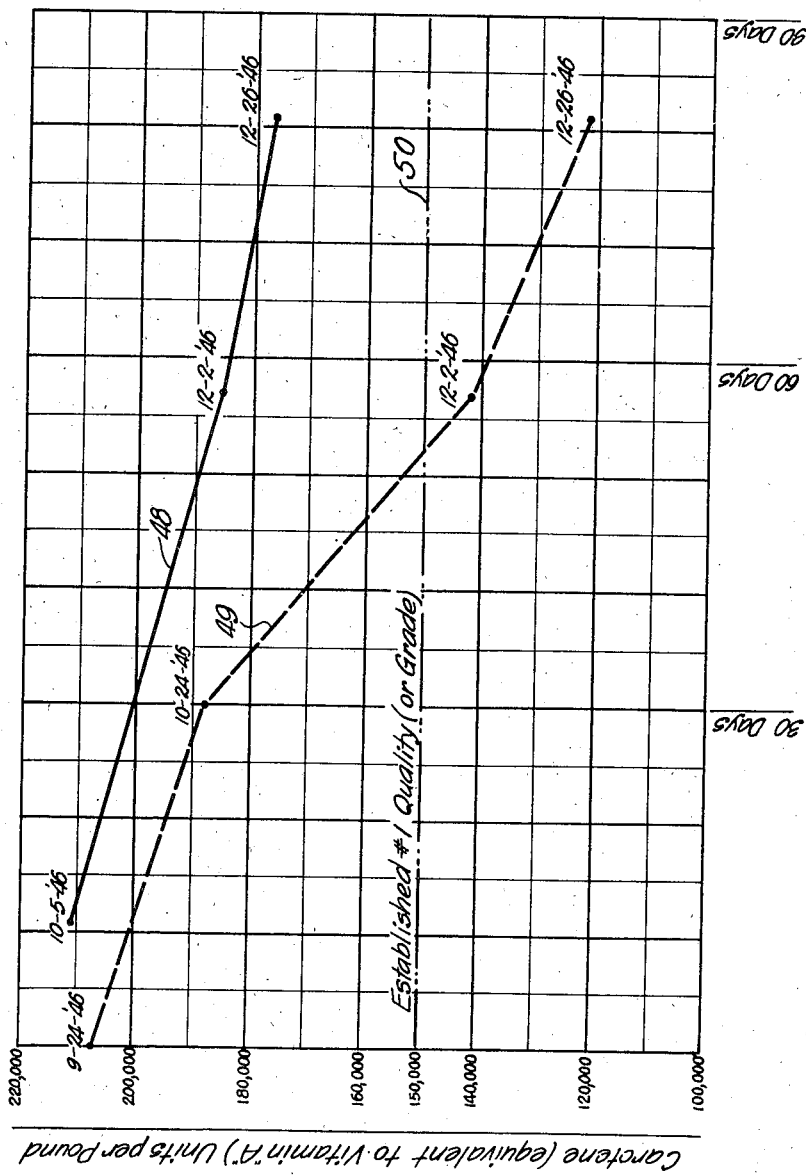
Fig. 2 is a graph showing the loss of carotene in storage of a product produced by the instant method and one produced by a conventional method.

In Fig. 2 is shown the deteriorating effect of storage upon the carotene content of bulk material produced according to the instant process and one produced by conventional dehydrating methods. The time period of storage for the tests was approximately 90 days. Points along the full line 48 are those indicating the deterioration of a coarse material made by the process described herein and points along broken line 49 show deterioration of the product made according to the old method. The median line 50 designating vitamin A content equivalent to 150,000 units, indicates the requirements established by the trade for No. 1 quality or grade alfalfa meal. It will be noted that deterioration of the coarse product is relatively slow as compared with that of the alfalfa meal made by conventional drying methods.

After storage in the bulk for a period of approximately three months, some of the coarse material produced according to the instant invention was pelletized and the pellets stored for an additional six months; tests made on the pellets at the beginning and end of the latter storage period revealed no loss whatever of vitamin A over the six months' period.

In summary then, the product produced by the method described has the following advantages:

1. Pelleted or baled feeds made from the product are clean and have little or no tendency to dust.
2. Pelleted or baled feeds can be stored with less loss of vitamin content.
3. Fire hazard is greatly reduced.
4. Storage space is reduced by approximately 50%.
5. Pelleted forage is a more natural feed and one more easily handled.
6. By this process pelleted forages are in a state that can be utilized by all ruminant and nonruminant animals and poultry.
7. This process makes possible material simulating year around fresh forage to animals and poultry fed in dry lots and reduces nutrient losses to a minimum.

From the foregoing it will be seen that the invention is one well adapted to attain all of the ends and objects herein-above set forth together with other advantages which are obvious and which are inherent to the process and product.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

We claim:

1. A process of dehydrating a stock feed roughage comprising the steps of feeding the alfalfa to a stem splitting and chopping step wherein the stems and the leafy portion of the plants are reduced to substantially the same density, gravitational weight and moisture extractability, passing it thence to a drying step and evaporating moisture therefrom, removing the moisture from the solids in a separating step, cooling the dried solids in a cooling step to substantially atmospheric temperature and passing the cooled product to a baling step.

2. A process as in claim 1 wherein the baling step is replaced by a pelleting step.

3. A process as in claim 1 wherein drying is effected at a material temperature not in excess of 250° F.

4. A process of dehydrating a stock feed roughage comprising the steps of feeding the alfalfa to a stem splitting and chopping step wherein the stems and the leafy portion of the plants are reduced to substantially the same density, gravitational weight and moisture extractability, passing it thence to a drying step and evaporating moisture therefrom, removing the moisture from the solids in a separating step, cooling the dried solids in a cooling step to substantially atmospheric temperature.

OTTO F. MEYER.
HARLOW L. SCHMIDT.
ROLAND E. OWENS.
WILLIAM W. MINER, Jr.

REFERENCES CITED

The following references are of record in the file of this patent:

UNITED STATES PATENTS

| Number | Name | Date |
|---|---|---|
| 1,586,893 | Gay | Jun. 1, 1926 |
| 2,013,476 | Peebles | Sept. 3, 1935 |
| 2,168,532 | McGrath | Aug. 8, 1939 |
| 2,227,246 | Chuck | Dec. 31, 1940 |